United States Patent
Jensen et al.

(10) Patent No.: US 8,514,130 B1
(45) Date of Patent: Aug. 20, 2013

(54) DIRECTIONAL SPECTRAL AWARENESS WITH SINGLE ANTENNA RADIO

(75) Inventors: Dana J. Jensen, Marion, IA (US); Michael N. Newhouse, Marion, IA (US); Robert J. Frank, Cedar Rapids, IA (US); Jonathan P. Doane, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 247 days.

(21) Appl. No.: 13/075,645

(22) Filed: Mar. 30, 2011

(51) Int. Cl.
 *H04B 7/00* (2006.01)

(52) U.S. Cl.
 USPC ............................................. 342/367

(58) Field of Classification Search
 USPC ............................................. 342/367
 See application file for complete search history.

(56) References Cited

U.S. PATENT DOCUMENTS

| | | | |
|---|---|---|---|
| 6,178,333 B1* | 1/2001 | Feuerstein et al. | 455/503 |
| 2009/0085805 A1* | 4/2009 | Oomuro | 342/360 |
| 2009/0189812 A1* | 7/2009 | Xia et al. | 342/374 |
| 2010/0214169 A1* | 8/2010 | Kafle | 342/368 |

* cited by examiner

*Primary Examiner* — Harry Liu
(74) *Attorney, Agent, or Firm* — Donna P. Suchy; Daniel M. Barbieri

(57) ABSTRACT

The present disclosure is directed to a system and method for providing directional spectral awareness via an antenna system which includes a single parasitic antenna and a processor, the processor being communicatively coupled with the parasitic antenna. The antenna system allows for quick scanning of all sectors included in a plurality of sectors of an RF environment being monitored by the antenna system. The antenna system also allows for monitoring sectors of interest. The directionality of the parasitic antenna of the antenna system may reduce interference and multipath along with providing improved SNR due to antenna gain, thereby allowing for collection of signals of interest in a more favorable environment, thereby enabling analysis such as frequency and spatial use, signal detection, signal identification, and source geolocation to succeed when it may have failed if an omni-directional antenna were used.

12 Claims, 11 Drawing Sheets

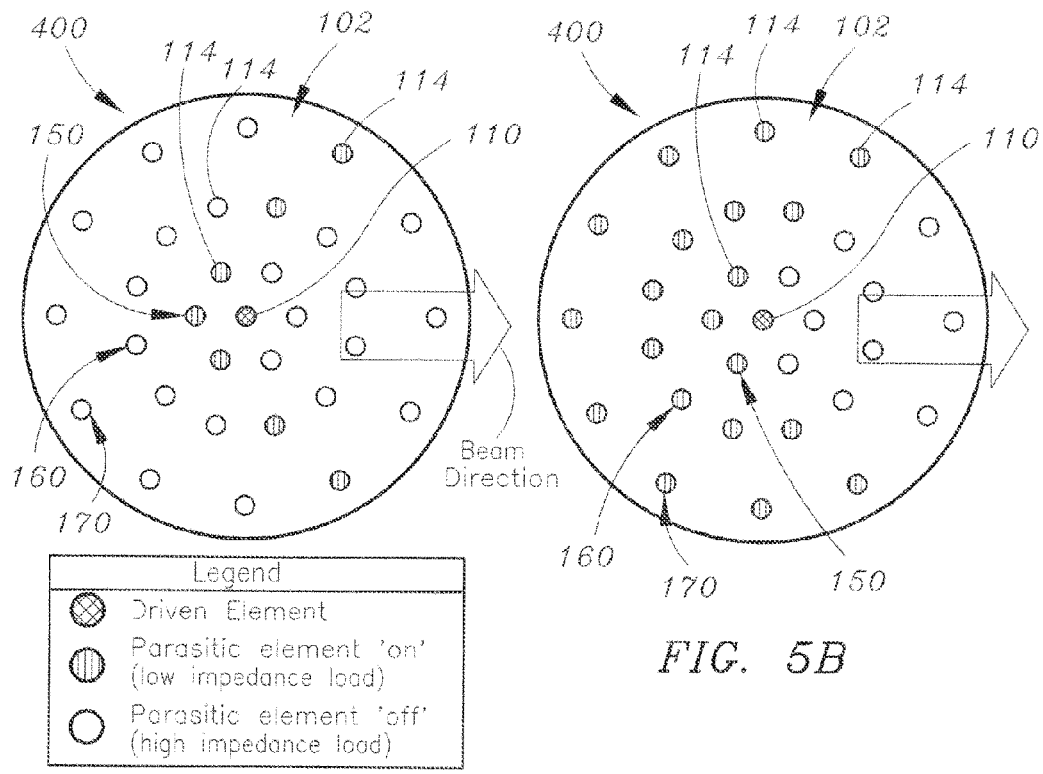
FIG. 5A
FIG. 5B
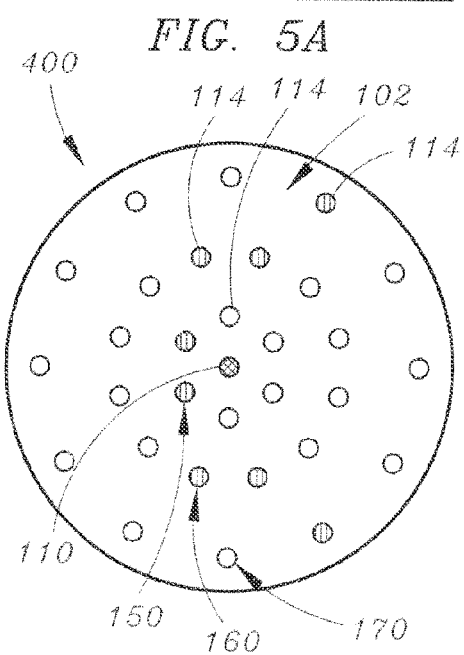
FIG. 5C
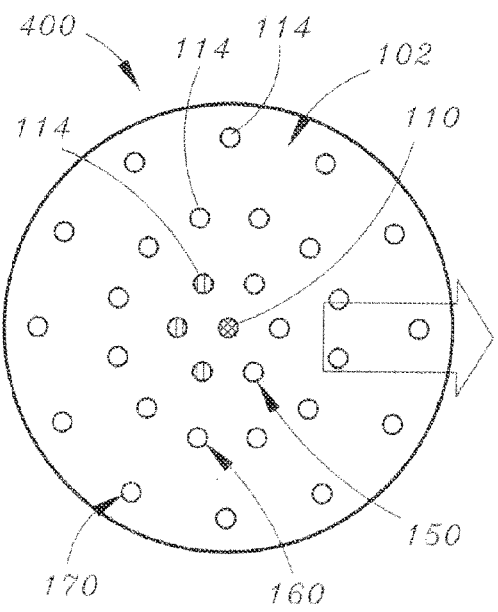
FIG. 5D

DIRECTIONAL SPECTRAL AWARENESS WITH SINGLE ANTENNA RADIO

CROSS-REFERENCE TO RELATED APPLICATIONS

U.S. patent application Ser. No. 12/977,198 entitled: A Multi-Ring Switched Parasitic Array for Improved Antenna Gain filed Dec. 23, 2010 (pending) is hereby incorporated by reference in its entirety herein. Further, U.S. patent application Ser. No. 12/729,372 entitled: An Improved Parasitic Antenna Array Design for Microwave Frequencies filed Mar. 23, 2010 (pending) is hereby incorporated by reference in its entirety herein.

FIELD OF THE INVENTION

The present disclosure relates to the field of antenna technology (ex.—multifunction antennas) and particularly to system(s) and method(s) for providing directional spectral awareness via one or more nodes, each node having a single directional antenna.

BACKGROUND OF THE INVENTION

The ability of a communications (ex.—sensing) node to quickly survey the spectral environment directionally has many applications. However, this ability also has significant Size, Weight, Power and Cost (SWaP-C) disadvantages. Currently implemented directional antenna systems are cumbersome (ex.—bulky), expensive, may require a great deal of maintenance, and may have very complex switching networks.

Thus, it would be desirable to provide an antenna system which obviates the problems associated with currently available implementations.

SUMMARY OF THE INVENTION

Accordingly, an embodiment of the present disclosure is directed to a method for providing directional spectral awareness via an antenna system, said method including the steps of: monitoring an environment for electromagnetic radiation in a plurality of sectors via the antenna system, the antenna system having a first mode and a second mode, the antenna system being configured for omni-directional signal reception from the plurality of sectors via the first mode, the antenna system being configured for transmission of electromagnetic radiation into and reception of electromagnetic radiation from at least one selected sector included in the plurality of sectors via the second mode; detecting a first signal transmitted by a signal source, the signal source being positioned apart from the antenna system; sweeping through the plurality of sectors, including the steps of: a.) during a first dwell time, determining a measurement for a first sector included in the plurality of sectors; b.) switching to a second sector included in the plurality of sectors; and c.) during a second dwell time, determining a measurement for the second sector included in the plurality of sectors; based upon said sweeping, identifying a sector corresponding to a direction of the signal source, including comparing the measurement for the first sector to the measurement for the second sector; and based upon said comparing, identifying the first sector as the sector corresponding to the direction of the signal source, wherein the antenna system includes a parasitic antenna and a processor, said processor being communicatively coupled with the parasitic antenna. The method may further include monitoring selected sectors included in the plurality of sectors during a subsequent sweep, said selected sectors being selected based upon compared measurements obtained for the plurality of sectors in the previous sweep.

An additional embodiment of the present disclosure is directed to a computer program product, including: a non-transitory computer-readable storage medium including computer-usable program code for performing a method for providing directional spectral awareness via an antenna system, the computer program product including: computer-usable program code for monitoring an environment for electromagnetic radiation in a plurality of sectors via the antenna system, the antenna system having a first mode and a second mode, the antenna system being configured for omni-directional signal reception from the plurality of sectors via the first mode, the antenna system being configured for transmission of electromagnetic radiation into and reception of electromagnetic radiation from at least one selected sector included in the plurality of sectors via the second mode; computer-usable program code for detecting a first signal transmitted by a signal source, the signal source being positioned apart from the antenna system; computer-usable program code for sweeping through the plurality of sectors, said sweeping including the steps of: a.) during a first dwell time, determining a measurement for a first sector included in the plurality of sectors; b.) switching to a second sector included in the plurality of sectors; and c.) during a second dwell time, determining a measurement for the second sector included in the plurality of sectors; computer-usable program code for, based upon said sweeping, identifying a sector corresponding to a direction of the signal source, including comparing the measurement for the first sector to the measurement for the second sector; and computer-usable program code for, based upon said comparing, identifying the first sector as the sector corresponding to the direction of the signal source, wherein the antenna system includes a parasitic antenna and a processor, said processor being communicatively coupled with the parasitic antenna. Further, monitoring of selected sectors included in the plurality of sectors may occur during a subsequent sweep, said selected sectors being selected based upon compared measurements obtained for the plurality of sectors in the previous sweep.

A further embodiment of the present disclosure is directed to an antenna system, including: a parasitic antenna, the parasitic antenna being configured for receiving a signal from a signal source, the signal source being positioned apart from the parasitic antenna in a first directional orientation relative to the parasitic antenna, the parasitic antenna being configurable for transmitting and receiving electromagnetic radiation in a selectable direction; and a processor, the processor being communicatively coupled to the parasitic antenna, the processor being configured for directing the parasitic antenna to sweep through a plurality of directions for identifying a first direction corresponding to the first directional orientation of the first signal source, wherein the first direction corresponding to the first directional orientation of the first signal source is identified based upon comparison of measurements for sectors of a Radio Frequency (RF) environment being monitored by the antenna system.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present disclosure may be better understood by those skilled in the art by reference to the accompanying figures in which:

FIG. 5A is a top plan view of the multi-ring switched parasitic antenna array of FIG. 4, shown as having a first excitation pattern in accordance with an exemplary embodiment of the present disclosure, said FIG. 5A also showing a legend applicable to FIGS. 5A-5D;

FIG. 5B is a top plan view of the multi-ring switched parasitic antenna array of FIG. 4, shown as having a second excitation pattern in accordance with a further exemplary embodiment of the present disclosure;

FIG. 5C is a top plan view of the multi-ring switched parasitic antenna array of FIG. 4, shown as having a third excitation pattern in accordance with a further exemplary embodiment of the present disclosure;

FIG. 5D is a top plan view of the multi-ring switched parasitic antenna array of FIG. 4, shown as having a fourth excitation pattern in accordance with a further exemplary embodiment of the present disclosure;

DETAILED DESCRIPTION OF THE INVENTION

Figure 1:
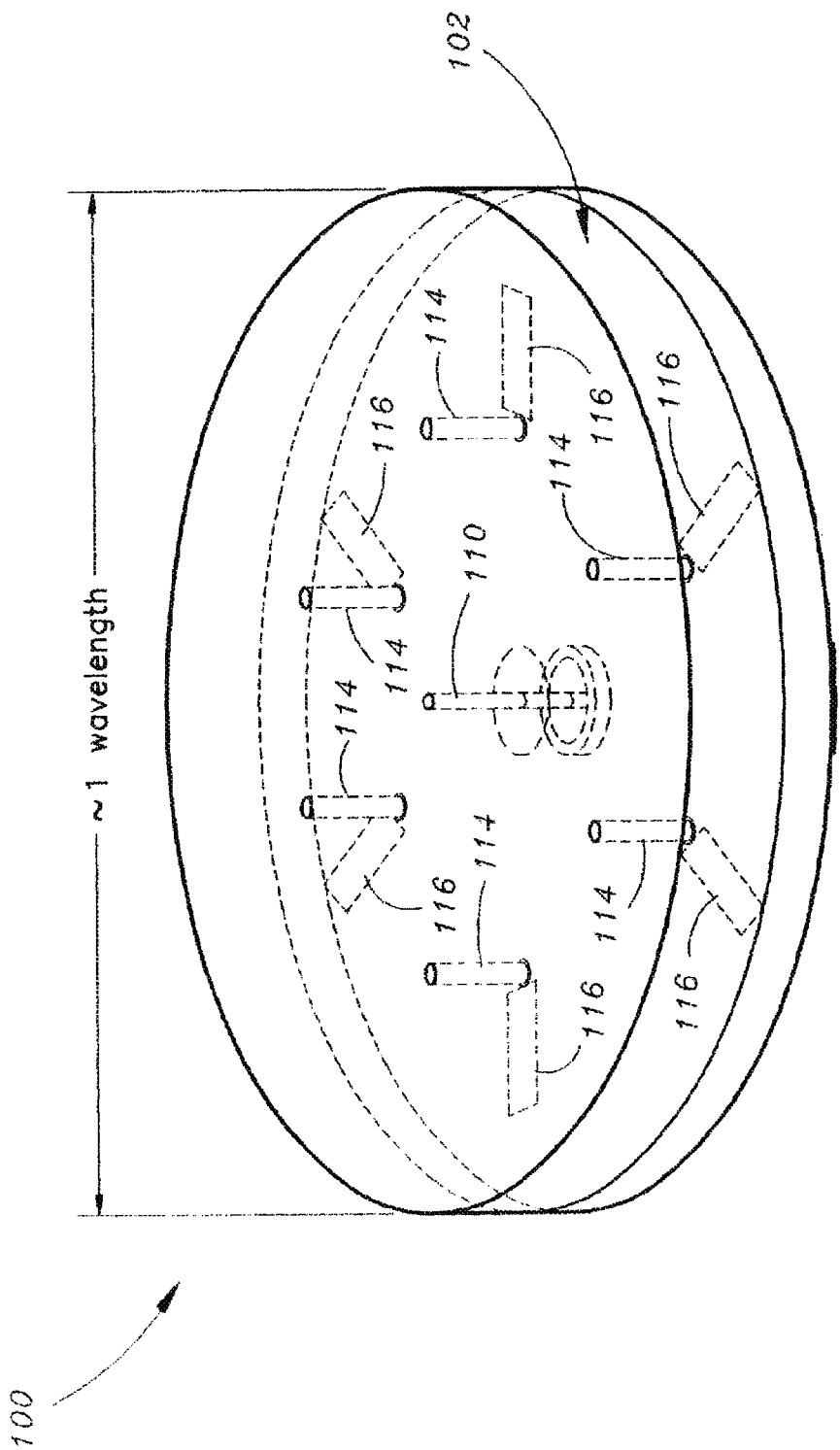
FIG. 1 is a view of a parasitic antenna array in accordance with an exemplary embodiment of the present disclosure.

Reference will now be made in detail to the presently preferred embodiments of the invention, examples of which are illustrated in the accompanying drawings.

The ability of a communications (ex.—sensing) node to quickly survey the spectral environment directionally has many applications, such as spectral awareness and signal intelligence, applied to cognitive radios. When spectral information is associated with position and direction, there are additional advantages. For example, it may be possible to route communications through a network based on said surveying. Spectral awareness can be an important component in selecting frequencies and bandwidths for interference-free communications. Spectral awareness can also be an important concept in identifying: a.) signals to provide cover; and/or b.) signals appropriate for snuggling. Signal intelligence can include detection and identification of signals.

Both spectral awareness and signal intelligence can benefit from additional and enhanced information resulting made possible by using directional antennas rather than omni-directional antennas. However, the Size Weight Power and Cost (SWaP-C) consequences of many directional antennas may restrict the scenarios in which directional antennas can be fielded practically. For example, implementing panels of directional antennas, or a ring of horn antennas may be problematic in that: the multiple panels or horns may result in large diameter antennas (bulky antennas); the multiple panels or horns may be difficult to mount; it may typically be very expensive to have multiple panels; such configurations may require complex switching networks to select an active panel; and/or the multiple panels or horns configurations may have issues providing omni-directional capability. Another currently available solution for providing directional surveying of the spectral environment is to implement a combination of panels and omni-directional antennas. However, such combination (ex.—configuration) suffers from cost, size and mounting issues, while also requiring a complex switching network for controlling the multiple, omni-directional antennas.

A further currently available solution for providing directional surveying of the spectral environment is to implement a narrow beam gimbal pointed antenna. However, the gimbal pointed antenna suffers from slow pointing. For instance, the gimbal pointed antenna may take longer than 0.1 seconds for an arbitrary point transition. Further, the gimbal pointed antenna has no omni-directional mode, is large and heavy (thereby presenting mounting issues), is expensive, and is susceptible to requiring frequent repair and maintenance of its moving parts. Another currently available solution for providing directional surveying of the spectral environment is to implement antenna arrays (ex.—an array of patch antennas or dipoles). However, such antenna arrays may require implementation of phase shifters and/or multiple transmit/receive (tx/rx) chains. Further, calibration of such antenna arrays may be very involved, requiring phase alignment per antenna element per frequency. Also, it may be very difficult to maintain calibration of such antenna arrays. Still further, depending on the type of antenna array being implemented, such antenna arrays: may require multiple panels (ex.—multiple patch antennas); may produce an antenna pattern having more than one beam (ex.—linear array may produce two beams); may provide a conformal array (ex.—of patch antennas) which is unable to get 360 degrees azimuth coverage unless multiple arrays are implemented (thereby resulting in increased expense and increased mounting complexity); may require significant complexity to provide omni coverage (ex.—to split/combine signals to/from elements or array panels).

As is evident from the above, it is not always feasible, with respect to SWaP-C, for nodes to have complex antennas and/or complex radios for determining spectral use with position and/or direction in a network. An antenna which could be quickly pointed may eliminate the need to implement multiple antennas or arrays. A directional antenna having favorable SWaP-C characteristics, and being capable of fast switching and omni-directional coverage may be a valuable resource. For example, it may be possible for many or all nodes of a network to each determine their own environment and to contribute to network-wide characterization of the Radio Frequency (RF) environment, rather than relying on a limited number of specialized, expensive nodes. Although an omni-directional antenna may be used to obtain general spectral use in the vicinity of a given node, a directional antenna offers the following advantages over omni-directional antennas: gain (thereby allowing detection at a greater distance from the source); and isolation from interference due to attenuation outside the main beam (thereby reducing multi-path interference, jammer interference and/or network interference). Further, a directional antenna having favorable SWaP-C characteristics, being capable of fast switching and having omni-directional coverage may have applications in signals intelligence (SIGINT), cognitive radio, spectral awareness and network monitoring.

Figure 2A:
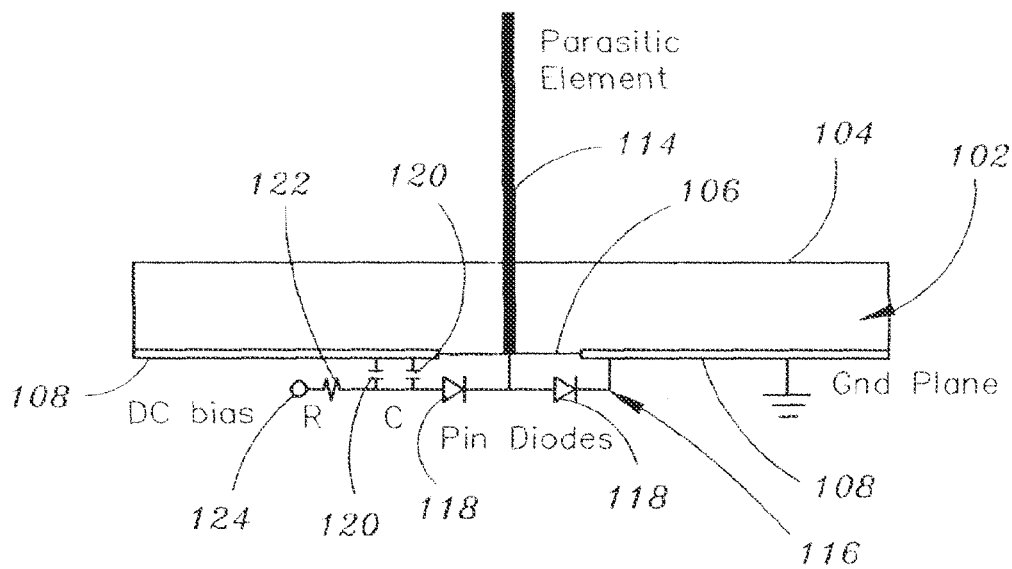
FIG. 2A is a view of a load circuit connected to the substrate of the parasitic array shown in FIG. 1 in accordance with an exemplary embodiment of the present disclosure.

Referring to FIG. 1, an antenna array (ex.—an antenna) in accordance with an exemplary embodiment of the present disclosure is shown. In a current exemplary embodiment of the present disclosure, the antenna array 100 may be a parasitic antenna array (ex.—a parasitic antenna) 100. In further embodiments of the present disclosure, the parasitic antenna array 100 may include a substrate 102. In exemplary embodiments of the present disclosure, the substrate 102 may be at least partially formed of printed circuit board material. Further, the substrate 102 may include a first surface (ex.—a top surface) 104 and a second surface (ex.—a bottom surface) 106 disposed generally opposite the first surface 104. Still further, a ground plane 108 may be connected to (ex.—may be configured on) the bottom surface 106 (as shown in FIG. 2A). In further embodiments of the present disclosure, the length of the antenna substrate 102 may be approximately one wavelength.

In further embodiments of the present disclosure, the parasitic antenna array 100 may further include a central element 110 connected to the substrate 102. For instance, the central element 110 may be a monopole element (ex.—a central monopole element) 110, or may be a monopole-type radiating element 110 (ex.—an ultra-wide band (UWB) monopole structure) that has the proper electrical properties to be suitable for parasitic array application. Further, the central element 110 may be connected to the substrate 102 and the ground plane 108 at a generally central location of the substrate 102 and the ground plane 108 (as shown in FIG. 1). Still further, the central element 110 may be an omni-directional element 110 configured for radiating electromagnetic energy in an omni-directional radiation pattern (ex.—in a monopole-like pattern). In further embodiments of the present disclosure, the central element 110 may be configured for being connected to a feed line (exs.—a Radio Frequency (RF) feed line, coaxial cable, printed circuit transmission line (such as microstrip, stripline, etc.) and/or the like) 112.

Figure 4:
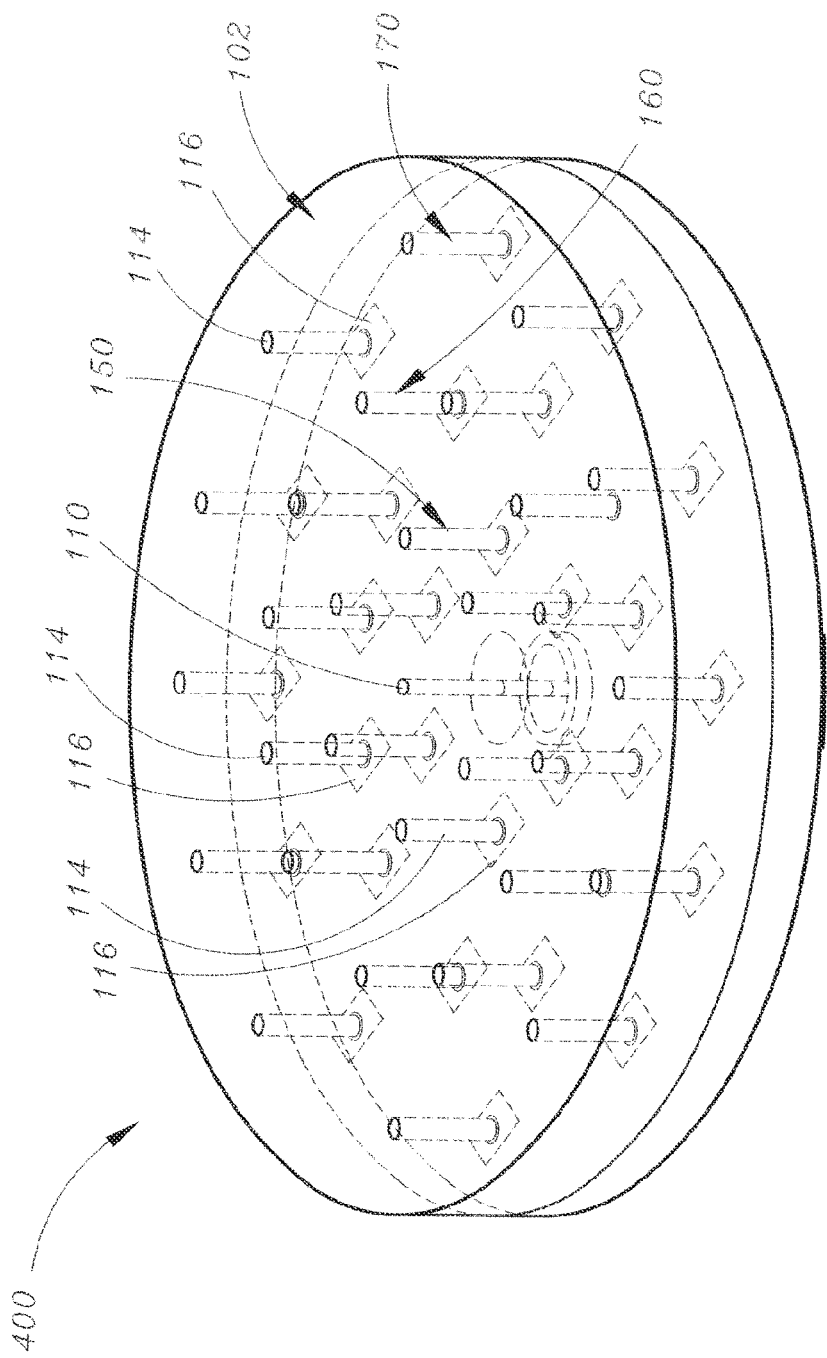
FIG. 4 is a view of a multi-ring switched parasitic antenna array in accordance with an exemplary embodiment of the present disclosure.

In exemplary embodiments of the present disclosure, the parasitic antenna array 100 may further include a plurality of parasitic elements (ex.—parasitic pins) 114. In the illustrated embodiment, the parasitic antenna array 100 includes six parasitic elements 114. However, varying numbers of parasitic elements 114 may be implemented in the parasitic antenna array 100 of the present disclosure. In further embodiments, the parasitic elements 114 may be connected to the substrate 102 and may be configured (exs.—oriented, arranged, located, established) in a generally circular arrangement so as to at least substantially surround (exs.—form a ring-like arrangement around, encircle) the central monopole element 110, wherein said central monopole element 110 may be generally centrally located within (ex.—may form the hub of) the ring created by the plurality of parasitic elements 114. In the illustrated embodiment of the present disclosure, one ring of parasitic elements 114 is established around the central monopole element 110. In alternative embodiments of the present disclosure, as shown in FIG. 4 and as discussed below, multiple (ex.—2 or more) rings of parasitic elements 114 may be configured around the central monopole element 110 for increasing gain of directional beams radiated by the parasitic antenna array 100. In an exemplary embodiment, the parasitic elements 114 may be thin wire (ex.—filamentary, narrow band) monopoles. In further embodiments, the parasitic elements 114 may be monopole-type radiating elements, such as ultra-wide band (UWB) monopole structures which have the proper electrical properties to be suitable for implementation for the concentric rings. In still further embodiments, the parasitic elements 114 included in a given ring of parasitic elements 114 may not all be the same type of radiating element. Further, in embodiments in which multiple rings of parasitic elements 114 are implemented, the parasitic elements 114 of a first ring may be different types of radiating elements than the parasitic elements 114 of a second ring.

In current exemplary embodiments of the present disclosure, each parasitic element 114 may be connected to a load (exs.—a load circuit, a variable impedance load) 116. For example, each parasitic element 114 may have a corresponding load circuit 116 connected (ex.—physically and electrically) to a base portion of said parasitic element 114 (as shown in FIG. 2A). In further embodiments, each load circuit 116 may be connected (ex.—physically and electrically) to the ground plane 108 configured on the bottom surface 106 of the substrate 102 (as shown in FIG. 2A). In still further embodiments of the present disclosure, each load circuit 116 may be an adjustable load circuit (ex.—an adjustable load) 116. Further, each load circuit 116 may be a parasitic load circuit (ex.—a parasitic load) 116.

Referring generally to FIG. 2A, a parasitic element 114 which is connected to its corresponding load circuit 116 is shown. In exemplary embodiments of the present disclosure, the load circuit 116 may include a plurality of diodes 118. For example, the load circuit 116 may include two diodes 118, such as two p-type, intrinsic, n-type (PIN) diodes 118. In further embodiments of the present disclosure, the load circuit 116 may further include one or more capacitors 120, the one or more capacitors 120 configured for being connected to at least one of the PIN diodes 118. In still further embodiments of the present disclosure, the load circuit 116 may further include a resistor 122, the resistor 122 configured for being connected to at least one of the one or more capacitors 120. In further embodiments of the present disclosure, the load circuit 116 may further include a Direct Current (DC) bias current source 124, the DC bias current source 124 configured for being connected to the resistor 122.

In current exemplary embodiments of the present disclosure, the two PIN diodes 118 of the load circuit 116 may be configured for being connected to each other. Further, the load circuit's corresponding parasitic element 114 may be configured for being connected between the two PIN diodes 118. Further, one of the two PIN diodes 118 may be configured for directly connecting the parasitic element 114 to the ground plane, while the other of the two PIN diodes 118 may be configured for connecting the parasitic element 114 to the ground plane 108 through one or more low impedance capacitors 120.

In exemplary embodiments of the present disclosure, the DC bias current source 124 may be configured for providing DC bias current to the resistor 122. The DC bias current may be transmitted through (ex.—may pass through) the resistor, thereby producing a voltage across the resistor 122. In further embodiments, the resistor 122 and capacitor(s) 120 may form a low pass filter for providing the DC bias current to the diodes 118. For example, in at least one embodiment, when electromagnetic energy is radiated by the monopole element 110, it may contact a parasitic element 114 and the electromagnetic energy (ex.—RF energy) may flow from the parasitic element 114 to a diode 118 of the load circuit 116 for that parasitic element and the RF energy may be shorted from the diode 118 directly to the ground plane 108 via the capacitor(s) 120. In still further embodiments, the resistor 122 may be small and/or may be sized to set a desired current level for a desired voltage.

Figure 3:
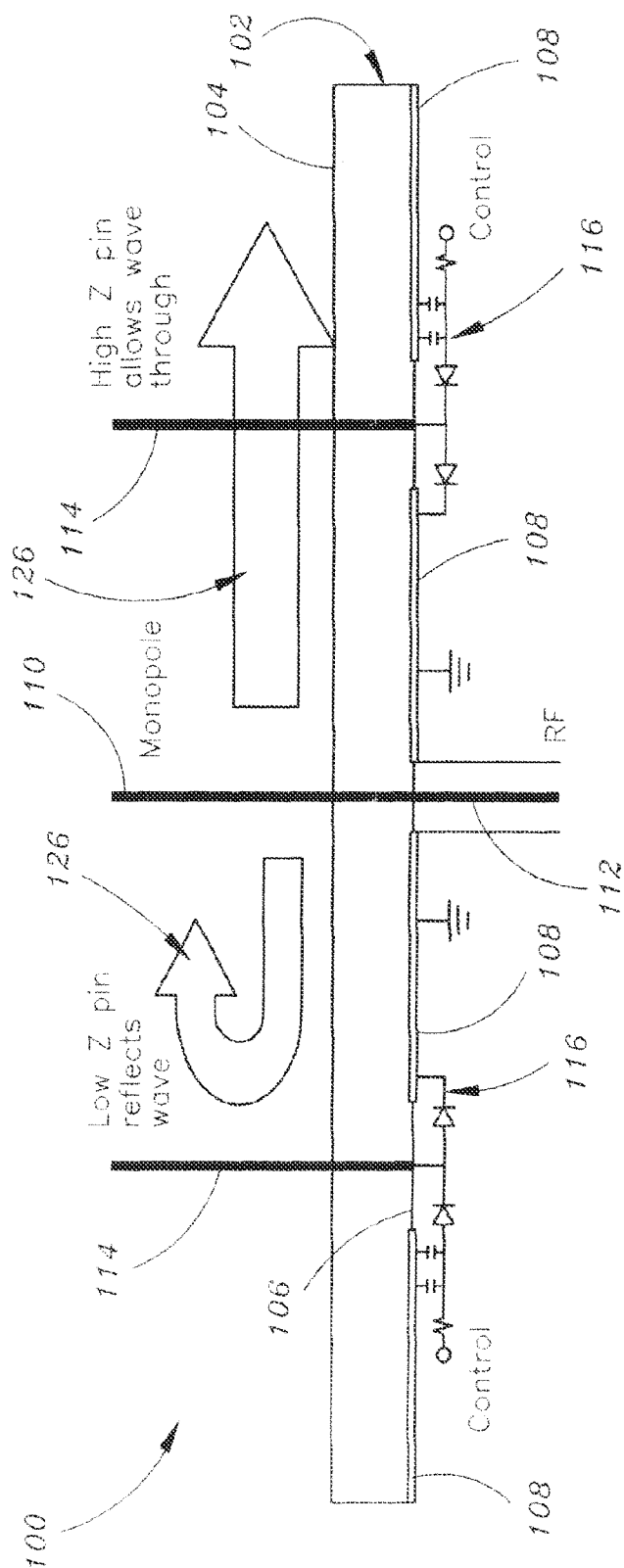
FIG. 3 is a block diagram schematic illustrating the operation of the parasitic antenna array shown in FIG. 1 in accordance with a further exemplary embodiment of the present disclosure.

In current exemplary embodiments of the present disclosure, the load circuit (ex.—variable impedance load) 116 may be configurable for allowing a variable (ex.—adjustable) impedance to be applied to the load circuit's corresponding parasitic element 114. As mentioned above, the monopole element 110 may be configured for receiving RF energy via the feed line 112 (as shown in FIG. 3). Further, based upon the received RF energy, the monopole element 110 may be configured for radiating electromagnetic energy (ex.—electromagnetic waves 126) in multiple directions (ex.—towards multiple parasitic elements 114 of the array 100). The electromagnetic waves 126 may excite a voltage (ex.—an applied voltage) on multiple parasitic elements 114. The relationship of the voltage and current present on a particular parasitic element 114 may be determined by the impedance (Z) applied to that parasitic element 114 via its load circuit 116 (ex.—a change in the voltage and current for the parasitic element 114 means that applied impedance provided via the load circuit 116 for that parasitic element 114 is changed also). For instance, when the applied impedance provided to a parasitic element 114 via its corresponding load circuit 116 is low (ex.—low Z), the current on that parasitic element 114 may be high (ex.—may be higher than the current present on the monopole element 110), which may cause the parasitic element 114 to reflect a wave radiated by the monopole 110 (as shown in FIG. 3). Further, when the applied impedance provided to a parasitic element via its corresponding load circuit 116 is high (ex.—high Z), the current on that parasitic element 114 may be low (ex.—may be lower than the current present on the monopole element 110), which may cause the parasitic element 114 to be transparent to a wave radiated by the monopole 110 (ex.—the parasitic element 114 may allow a wave radiated by the monopole 110 to pass through it). Thus, the applied impedance provided to each parasitic element 114 via its corresponding load circuit 116 may be selectively varied for causing the parasitic antenna array 100 to take (ex.—manipulate) the omni-directional monopole field radiated by the monopole element 110 and to radiate either multiple directional beams (ex.—azimuthal directional beams) or an omni-beam (ex.—a monopole-like radiation pattern). The parasitic antenna array 100 of the present disclosure is configured for applying the variable impedance to the parasitic elements 114 (via the variable impedance loads 116) for causing the antenna array 100 to produce a desired radiation pattern, and, unlike currently available parasitic antenna arrays, the parasitic antenna array 100 of the present disclosure is configured for doing this efficiently even at high (ex.—15 GHz) frequencies.

Figure 2B:
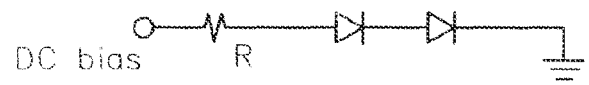
FIG. 2B is a block diagram schematic illustrating the operation of the load circuit shown in FIG. 2A when the parasitic antenna array is operating at low frequencies (ex.—3 GHz) in accordance with a further exemplary embodiment of the present disclosure.
Figure 2C:
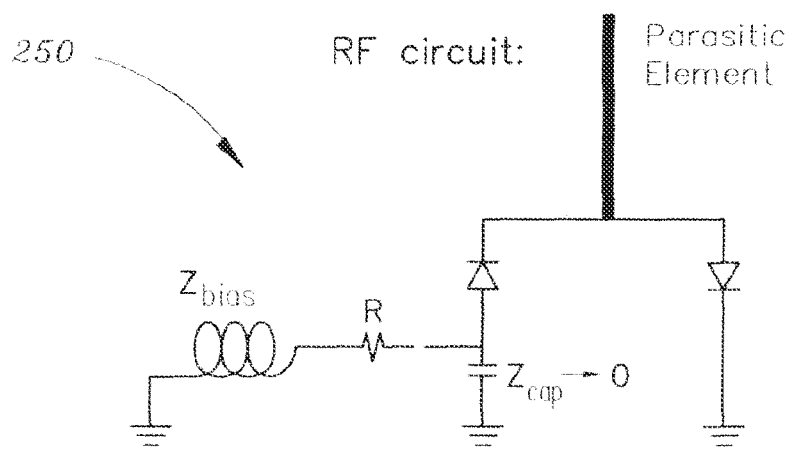
FIG. 2C is a block diagram schematic illustrating the operation of the load circuit shown in FIG. 2A when the parasitic antenna array is operating at high frequencies (ex.—15 GHz) in accordance with a still further exemplary embodiment of the present disclosure.

In exemplary embodiments of the present disclosure, it is the diodes 118 of each load circuit 116 which may control the RF load of each parasitic element, thereby affecting mutual coupling and reflectivity of the parasitic antenna array 100. In current exemplary embodiments of the present disclosure, depending upon the frequencies at which the parasitic antenna array 100 is operating at during a given time, the load circuit 116 may be configured for operating as a DC circuit or an RF circuit. For instance, when the parasitic antenna array 100 is operating at lower frequencies (ex.—3 GHz or below), each load circuit 116 may be configured for operating as a DC circuit 200 (as shown in FIG. 2B) in which the diodes 118 are placed in (ex.—connected in) series, thereby allowing the total DC current draw to be the same as a load circuit which implements only a single diode. As mentioned above, the parasitic antenna array 100 of the present disclosure is configured for applying the variable impedance to the parasitic elements 114 (via the variable impedance loads 116) for causing the antenna array 100 to produce a desired radiation pattern, and is configured for doing this efficiently even at high (ex.—15 GHz) frequencies. For instance, when the parasitic antenna array 100 is operating at higher frequencies (ex.—15 GHz), each load circuit 116 may be configured for operating as an RF circuit 250 (as shown in FIG. 2C) in which the diodes 118 are in parallel and any undesired impedance from the DC bias current source (ex.—DC bias circuit) 124 is shorted out by the parallel diode 118 tied directly to ground 108, thereby allowing the parasitic antenna array 100 of the present disclosure to provide dramatically improved performance and efficiency at higher frequencies relative to currently available parasitic antenna arrays 100.

The parasitic antenna array 100 of the present disclosure may provide improved RF and DC performance over currently available parasitic antenna arrays because the parasitic antenna array 100 of the present disclosure does not implement a biasing scheme which depends upon inductors (inductors may often be impractical and lossy at high frequencies), nor does the parasitic antenna array 100 of the present disclosure implement a biasing scheme which depends upon quarter wave matching sections (quarter wave matching sections may often be lossy and band limiting), nor does the parasitic antenna array 100 of the present disclosure implement a biasing scheme which depends upon large blocking resistors (large blocking resistors may be impractical for current-controlled devices).

Further, the parasitic antenna array 100 of the exemplary embodiments of the present disclosure may be configured for usage (ex.—practical usage) at higher microwave frequencies, such as up to $K_u$ band (ex.—15 Gigahertz (GHz)). For example, the parasitic antenna array 100 of the present disclosure may exhibit a directional gain which is greater than 5 dBi (decibels (isotropic)) at 15 GHz. Further, the parasitic antenna array 100 of the exemplary embodiments of the present disclosure may be configured for being omni-directional, may be suitable for mobile microwave Intelligence Surveillance Reconnaissance (ISR) data links (ex.—ISR applications), and/or may be suitable for Unmanned Aerial Vehicles (UAV) applications, hand-held applications, soldier platforms, Miniature Common Data Link (MiniCDL) applications, and/or Quint Networking Technology (QNT) applications. Still further, the parasitic antenna array 100 of the present disclosure may represent a significant size, weight, power and cost (SWAP-C) improvement (exs.—smaller SWAP-C, greater than 50 times size, weight and cost reduction) compared to currently available $K_u$ band antennas (ex.—Intelligence Surveillance and Reconnaissance (ISR) $K_u$ band antennas).

Because the parasitic antenna array 100 of the present disclosure distributes thermal load across two devices (ex.—across two PIN diodes 118), the parasitic antenna array 100 of the present disclosure may provide improved power handling over currently available parasitic antenna arrays. Further, because the parasitic antenna array 100 of the exemplary embodiments of the present disclosure may dissipate power across multiple diodes 118, the parasitic antenna array of the present disclosure may be configured for achieving higher power operation (ex.—greater than 20 Watts (>20 W)) than currently available parasitic antenna arrays.

In further embodiments of the present disclosure, all interconnects for the parasitic antenna array 100 may be configured for being as short as possible, so as to remove any undesired impedances (ex.—undesired stray impedances). Further, because the ground plane 108 of the parasitic antenna array 100 of the present disclosure is configured on the same side (ex.—the bottom 106) of the substrate 102 as the load circuit 116, this eliminates the need for the parasitic antenna array 100 of the present disclosure to have inductive vias. This is advantageous as inductive vias often add significant impedance at high frequencies.

In exemplary embodiments of the present disclosure, large resistances may be placed in parallel with each diode 118 to balance reverse bias voltage across the diodes 118, such as when said diodes 118 are not well-matched. Said balancing of reverse bias voltage across the diodes 118 may be performed without significantly impacting RF performance.

In further alternative embodiments of the present disclosure, other two-terminal variable impedance devices may be implemented, such as varactor diodes and/or variable capacitors. Further, in some applications, FET switching transistors or any other transistor switch technologies may be substituted for PIN diode switches.

As mentioned above, in alternative embodiments of the present disclosure, multiple rings of parasitic elements 114 may be configured around the central monopole element 110 for increasing gain of directional beams radiated by the parasitic antenna array. FIG. 4 depicts a parasitic antenna array (exs.—a multi-ring parasitic antenna array 400, a multi-ring parasitic antenna 400) having multiple rings of parasitic elements 114 configured around the central monopole element 110. The multi-ring parasitic antenna array 400 (shown in FIG. 4) may be constructed in a same or similar manner as the parasitic antenna array 100 (shown in FIG. 1) discussed above, except that the multi-ring parasitic antenna array 400 may be configured with a larger number of parasitic elements 114, with said additional parasitic elements being configured around the first ring of parasitic elements 114 as part of additional rings of parasitic elements 114 formed around the central monopole element 110. For example, as shown in FIG. 4, the multi-ring parasitic array 400 may include a first ring 150 of parasitic elements 114 configured around the central monopole element 110, a second ring 160 of parasitic elements 114 configured around the central monopole element 110 (said second ring 160 also being configured around the first ring 150), and a third ring 170 of parasitic elements 114 configured around the central monopole element 110 (said third ring 170 also being configured around the second ring 160). Further, the multi-ring parasitic antenna array 400 may include additional corresponding load circuits 116 for each of the additional parasitic elements 114, said additional load circuits 116 being constructed in a same or similar manner as the load circuits 116 described above. By implementing the additional rings of parasitic elements 114, the multi-ring parasitic array 400 may radiate directional beams having increased gain over directional beams radiated by the parasitic antenna array 100 shown in FIG. 1. Thus, gain of the array 400 may increase with the number of rings of parasitic elements 114 being implemented. Further, the gain of the array 400 (ex.—antenna 400) may increase linearly with the diameter of the substrate 102 of the array 400. For example, doubling the diameter of the substrate 102 may cause a corresponding 3 decibel (dB) increase in the gain of the array 400. In further embodiments, the multi-ring parasitic array 400 may implement and/or may be a Circular Switched Parasitic Array (CSPA) with switched loads or an Electronically Steerable Parasitic Array Radiator (ESPAR) with analog tunable loads.

In further embodiments of the present disclosure, the applied impedances provided to the parasitic elements 114 of the multi-ring parasitic array 400 via their corresponding load circuits 116 may be selectively established, varied and/or re-established for causing the parasitic antenna array 400 to manipulate the omni-directional monopole field radiated by the monopole element 110 and to radiate either multiple directional beams (ex.—azimuthal directional beams) or an omni-beam (ex.—a monopole-like radiation pattern). The parasitic antenna array 400 of the present disclosure is configured for allowing variable impedances to be applied to the parasitic elements 114 (via the variable impedance loads 116) for causing the antenna array 400 to produce a desired radiation pattern. For example, in a first scenario, when an impedance applied to a parasitic element 114 is a first impedance value (ex.—a low impedance value), the resulting current on that parasitic element 114 may be high (ex.—may be a current value which is high, may be a current value which is higher than a current value present on the monopole element), thereby causing that parasitic element to reflect electromagnetic energy radiated by the central monopole 110 of the antenna array 400 (ex.—thereby causing said parasitic element to be an "on" element). Alternatively, in a second scenario, when an impedance applied to the parasitic element 114 is a second impedance value (ex.—a high impedance value, a higher impedance value than the first impedance value), the resulting current on the parasitic element 114 may be low (ex.—may be a low current value, may be a lower current value than the current value in the first scenario, may be a lower current value than a current value present on the monopole element), thereby causing the parasitic element 114 to be transparent to a wave radiated by the monopole 110 (ex.—thereby causing said parasitic element to be an "off" element).

As mentioned above, the applied impedances provided to the parasitic elements 114 of the multi-ring parasitic array 400 via their corresponding load circuits 116 may be selectively established, varied and/or re-established for causing the parasitic antenna array 400 to manipulate the omni-directional monopole field radiated by the monopole element 110 and to radiate either multiple directional beams (ex.—azimuthal directional beams) or an omni-beam (ex.—a monopole-like radiation pattern). Parasitic elements 114 may be selectively established as "on" or "off" elements as described above, based upon the applied impedances provided to them via their corresponding load circuits 116. In further embodiments, as shown in FIGS. 5A, 5B, 5C and 5D, the parasitic elements 114 may be selectively established as being "on" or "off", such that any one of a number of various subsets (ex.—patterns) of parasitic elements 114 included in the plurality of parasitic elements 114 may be established as "on" elements, said "on" elements functioning as a steerable reflector. In an exemplary embodiment, the subset (ex.—pattern) of "on" elements 114 may be strategically selected for promoting maximum DC power efficiency (FIG. 5A) and/or for promoting maximum RF gain (FIG. 5B). For instance, parasitic elements 114 of the second ring 160, which are positioned behind the "on" elements 114 of the first ring 150 may be selectively established to be "on" elements 114 for promoting maximum RF gain (as shown in FIG. 5B) or may be selectively established as being "off" elements 114 for promoting maximum DC power efficiency (ex.—low DC power draw) (as shown in FIG. 5A). Arrows shown in FIGS. 5A, 5B and 5D depict the direction of the beam(s) provided via the multi-ring switched parasitic antenna array 400 when said array 400 is established with the excitation patterns depicted in FIGS. 5A, 5B and 5D.

In further embodiments, as the number of rings increases, more beams may be required than a number of rotationally symmetric positions. Thus, alternate beamstates may be excited (ex.—alternate patterns parasitic elements 114 may be established as "on" elements) for steering a beam in a different direction and/or in a different plane of symmetry (as shown in FIG. 5C). In still further embodiments, alternate beamstates may be excited (ex.—alternate patterns parasitic elements 114 may be established as "on" elements) for adjusting beamwidth (FIG. 5D); steering simultaneous beams, steering simultaneous beams and nulls; and/or providing different beam types (ex.—omni-beam, multi-beam, nulling, beam broadening, etc.). In further embodiments, an array of LEDs in a same pattern as the parasitic elements (ex.—parasitic pins) 114 may be used for visualizing antenna excitation. For example, the LEDs may be integrated onto a same board as the pins 114 or onto a separate board from the pins 114, and may be used for troubleshooting, diagnostics, demonstration and/or integration.

Further, the parasitic antenna array 400 of the exemplary embodiments of the present disclosure may be configured for being omni-directional, may be suitable for mobile microwave Intelligence Surveillance Reconnaissance (ISR) data links (ex.—ISR applications), and/or may be suitable for Unmanned Aerial Vehicles (UAV) applications, hand-held applications, soldier platforms, Miniature Common Data Link (MiniCDL) applications, Air-to-Ground (ATG) 4G cellular and/or Quint Networking Technology (QNT) applications. Still further, the parasitic antenna array 400 of the present disclosure may represent a significant size, weight, power and cost (SWAP-C) improvement (exs.—smaller SWAP-C, greater than 50 times size, weight and cost reduction) compared to currently available $K_u$ band antennas (ex.—Intelligence Surveillance and Reconnaissance (ISR) $K_u$ band antennas). In further embodiments, a digital interface board (not shown) may be integrated with the antenna(s) (100, 400).

Figure 6A:
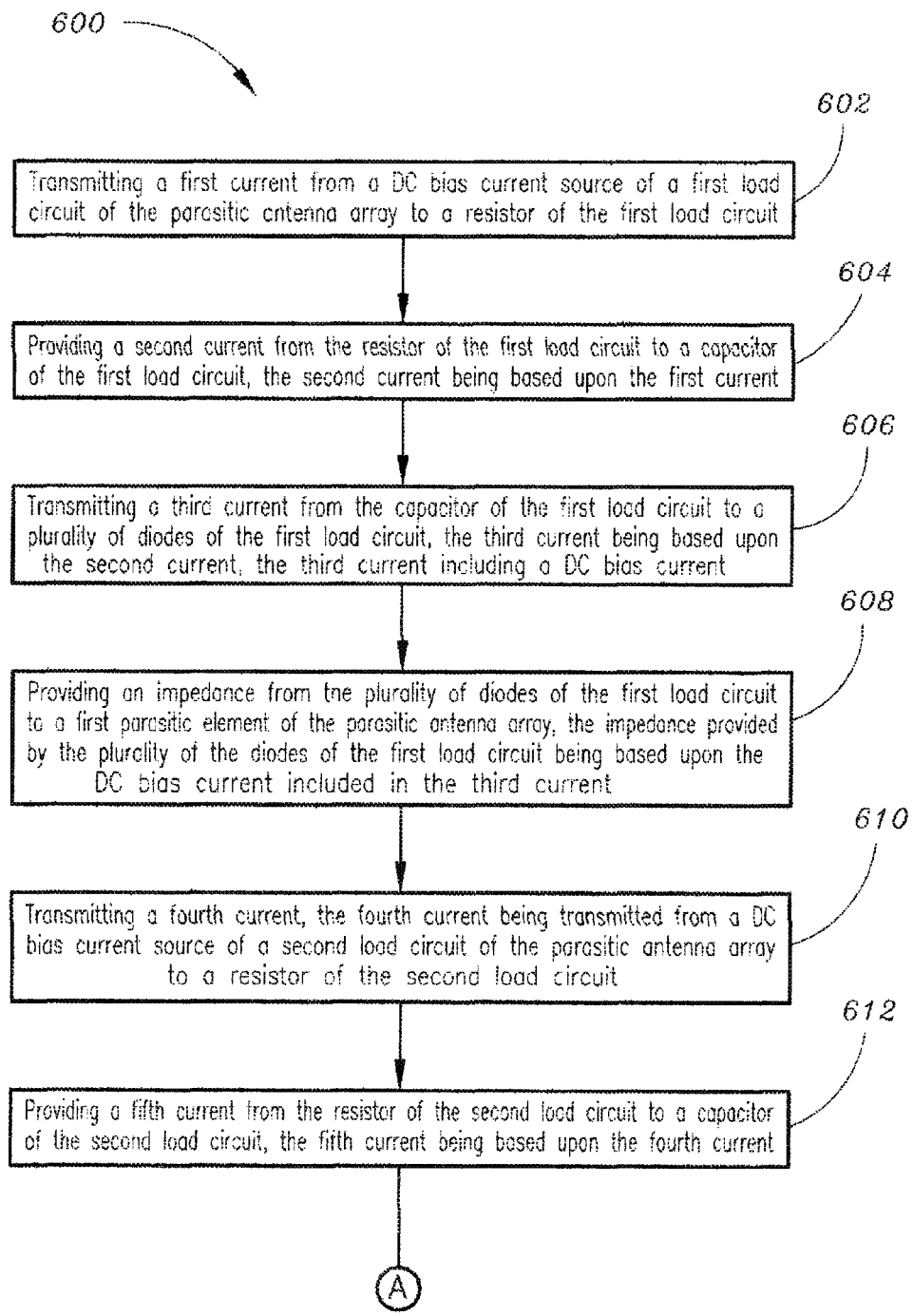
FIGS. 6A and 6B depict a flowchart illustrating a method of operation of the multi-ring parasitic antenna array of FIG. 4, in accordance with a further exemplary embodiment of the present disclosure.
Figure 6B:
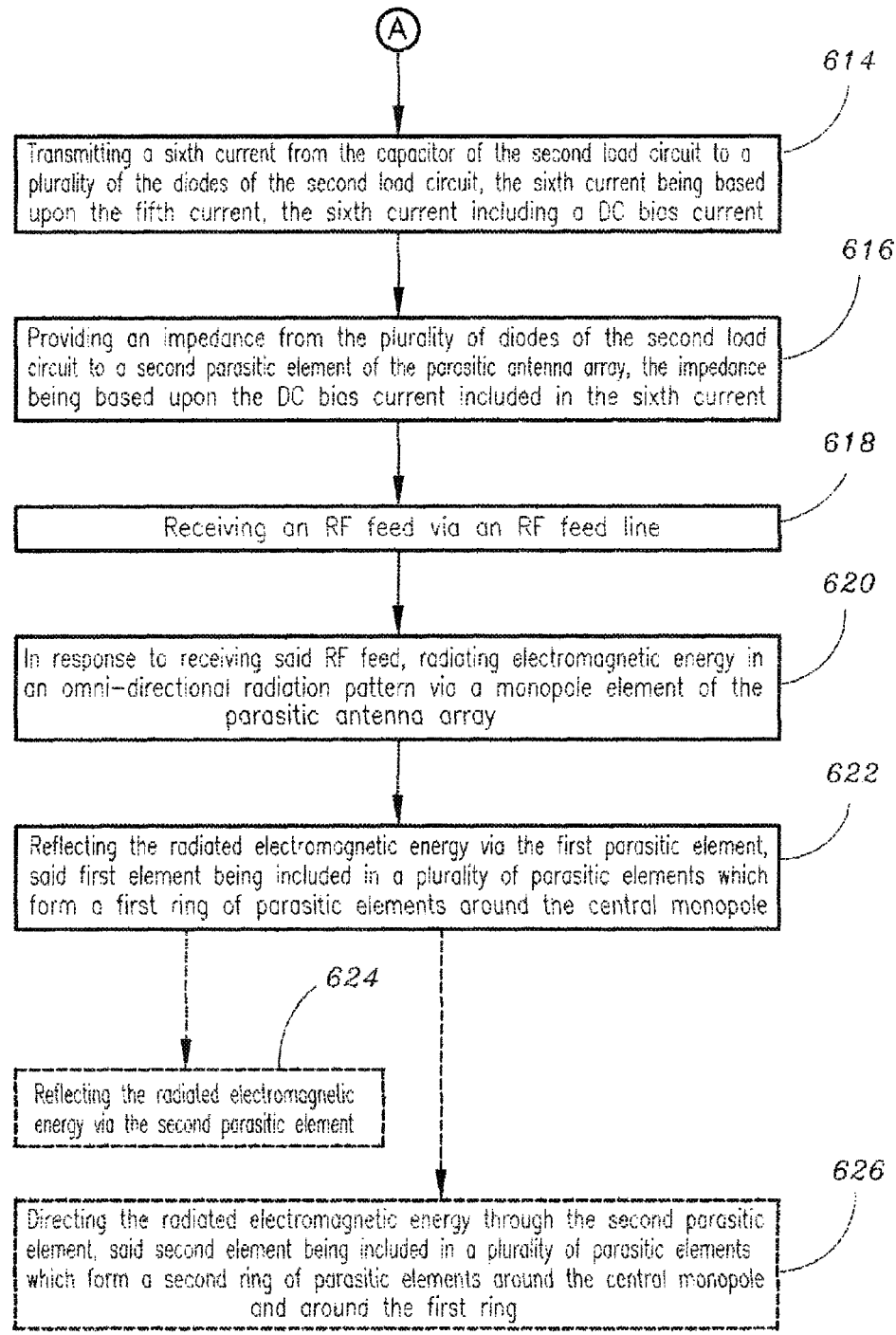

Referring generally to FIGS. 6A and 6B, a flowchart illustrating a method of operation of a parasitic antenna array of the present disclosure in accordance with an exemplary embodiment of the present disclosure is shown. The method 600 may include the step of transmitting a first current from a DC bias current source of a first load circuit of the parasitic antenna array to a resistor of the first load circuit 602. The method 600 may further include the step of providing a second current from the resistor of the first load circuit to a capacitor of the first load circuit, the second current being based upon the first current 604. The method 600 may further include the step of transmitting a third current from the capacitor of the first load circuit to a plurality of diodes of the first load circuit, the third current being based upon the second current, the third current including a DC bias current 606. The method 600 may further include the step of providing an impedance from the plurality of diodes of the first load circuit to a first parasitic element of the parasitic antenna array, the impedance provided by the plurality of diodes of the first load circuit being based upon the DC bias current included in the third current 608.

In exemplary embodiments of the present disclosure, the method 600 may further include the step of transmitting a fourth current, the fourth current being transmitted from a DC bias current source of a second load circuit of the parasitic antenna array to a resistor of the second load circuit 610. The method 600 may further include the step of providing a fifth current from the resistor of the second load circuit to a capacitor of the second load circuit, the fifth current being based upon the fourth current 612. The method 600 may further include the step of transmitting a sixth current from the capacitor of the second load circuit to a plurality of diodes of the second load circuit, the sixth current being based upon the fifth current, the sixth current including a DC bias current 614. The method 600 may further include the step of providing an impedance from the plurality of diodes of the second load circuit to a second parasitic element of the parasitic antenna array, the impedance being based upon the DC bias current included in the sixth current 616.

The method 600 may further include the step of receiving an RF feed via an RF feed line 618. The method 600 may further include the step of, in response to receiving said RF feed, radiating electromagnetic energy in an omni-directional radiation pattern via a monopole element of the parasitic antenna array 620. In further embodiments, the method 600 may further include the step of reflecting the radiated electromagnetic energy via the first parasitic element 622. In exemplary embodiments, the first parasitic element may be included in a plurality of parasitic elements which form a first ring 150 of parasitic elements 114 around the central monopole 110. The method 600 may further include the step of reflecting the radiated electromagnetic energy via the second parasitic element 624 or alternatively, the step of directing the radiated electromagnetic energy through the second parasitic element (ex.—the second parasitic element is transparent to the radiated electromagnetic energy) 626. In exemplary embodiments, the second parasitic element may be included in a plurality of parasitic elements which form a second ring 160 of parasitic elements 114 around the central monopole 110, said second ring 160 also being formed around the first ring 150. In further embodiments, the method 600 may include the step of shorting RF energy from a diode included in the plurality of diodes of the first load circuit directly to a ground plane of the parasitic antenna array via the capacitor of the first load circuit 628 (not shown). In still further embodiments, the method 600 may include the step of shorting RF energy from a diode included in the plurality of diodes of the second load circuit directly to the ground plane of the parasitic antenna array via the capacitor of the second load circuit 630 (not shown).

Figure 7:
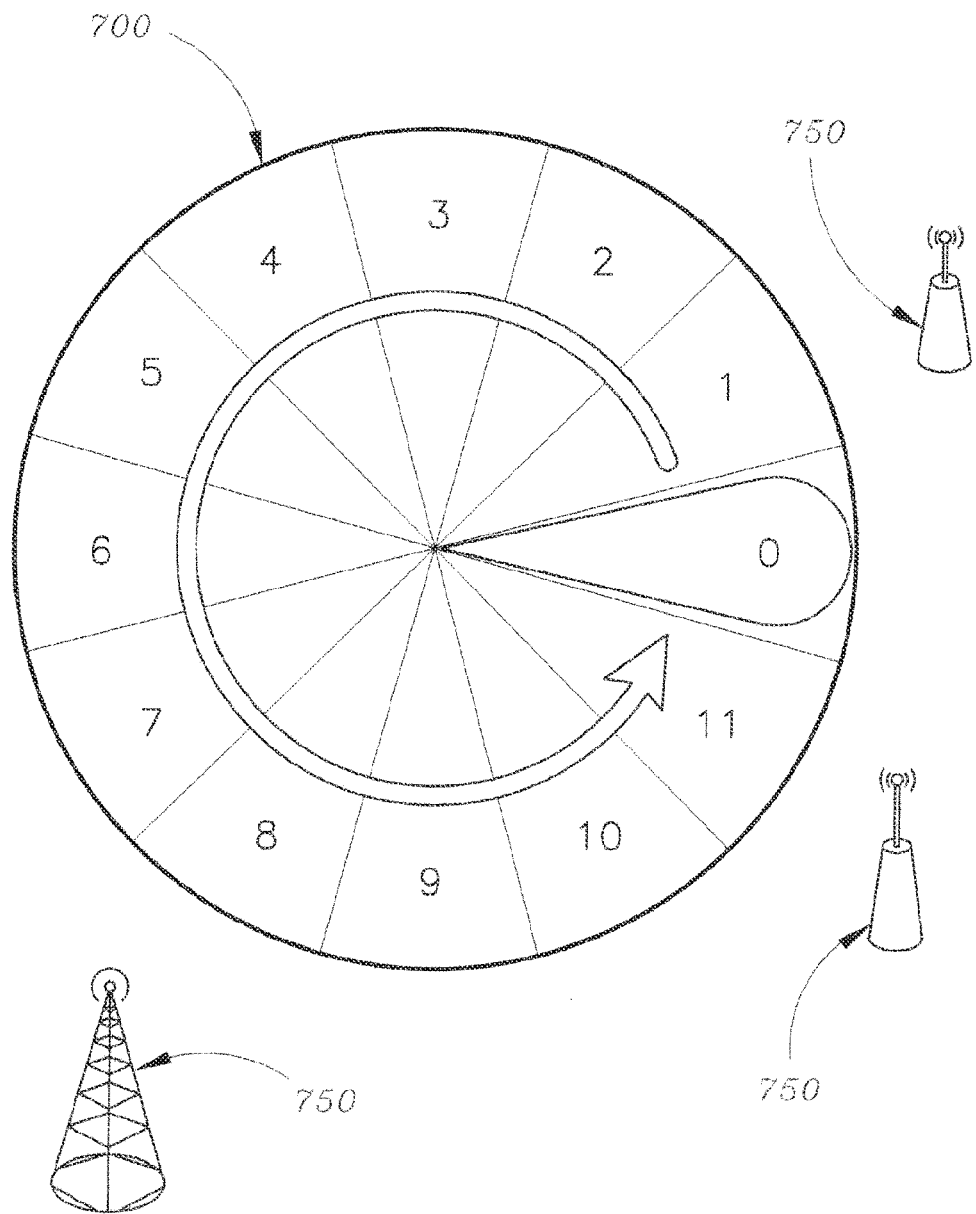
FIG. 7 is a schematic diagram illustrating an antenna system, which is shown sweeping through a plurality of sectors of a Radio Frequency (RF) environment being monitored by the antenna system, in accordance with an exemplary embodiment of the present disclosure.

As mentioned above, a directional antenna having favorable SWaP-C characteristics, and being capable of fast switching, quick pointing and omni-directional coverage may be a valuable resource for determining spectral use with position and/or direction in a network. The parasitic antenna embodiments (100, 400) described herein, such as the multi-ring parasitic antenna 400, may be/may provide a directional antenna having the above-described desirable characteristics. As mentioned above, although the multi-ring parasitic antenna 400 has a single driven element 110, it can offer directionality, fast beam switching and the potential to offer various beam shapes, while also having favorable SWaP-C characteristics. Referring to FIG. 7, in exemplary embodiments of the present disclosure, the multi-ring parasitic antenna 400 may be implemented as part of an antenna system 700, said antenna system 700 also including a processor (not shown), said processor configured for being integrated with and/or connected to the multi-ring parasitic antenna 400.

In exemplary embodiments of the present invention, the antenna 400 is configured for receiving and transmitting electromagnetic radiation in selectable direction(s), thereby allowing the antenna system 700 is to directionally monitor a Radio Frequency (RF) environment. In further embodiments, as shown in FIG. 7, the processor of the antenna system 700 may be configured for directing the antenna 400 to quickly sweep through an omni-directional pattern (ex.—an omni-pattern) relative to the antenna 400. For instance, as shown in FIG. 7, the omni-pattern may be a 360 degree pattern, the pattern including a plurality of (ex.—twelve) sectors, shown as sectors 0-11 in FIGS. 7 and 8. The antenna 400 may be configured for receiving signals via one or more sectors of the omni-directional pattern (ex.—omni-pattern) from signal source(s) (ex.—transmitter(s)) 750 positioned apart from the antenna 400 in one or more directional orientations relative to the antenna 400. In exemplary embodiments, the sectors may be sequentially swept (ex.—cycled) through and one or more measurements, estimates, and/or metrics for each of the sectors may be determined (ex.—measured) by the antenna system 700. For example, the average power (ex.—of the signals received by the antenna 400) per sector may be measured by the antenna system 700. In further examples, the modulation type, data rate, bandwidth, center frequency and/or spectral shape for each of the sectors may be determined (ex.—measured) by the antenna system 700. In embodiments in which the average power per sector is measured, based upon the measured average power (ex.—of the signals received from the transmitter(s) 750 by the antenna 400) per sector, the antenna system 700 may determine which sector(s) the transmitter(s) 750 of said signals may be located in. For instance, sectors in which transmitters are located (such as sectors 1, 8 and 11), may have higher measured average power than other sectors of the omni-pattern, thus said antenna system 700 may determine that said transmitters 750 are located in those sectors.

Figure 8:
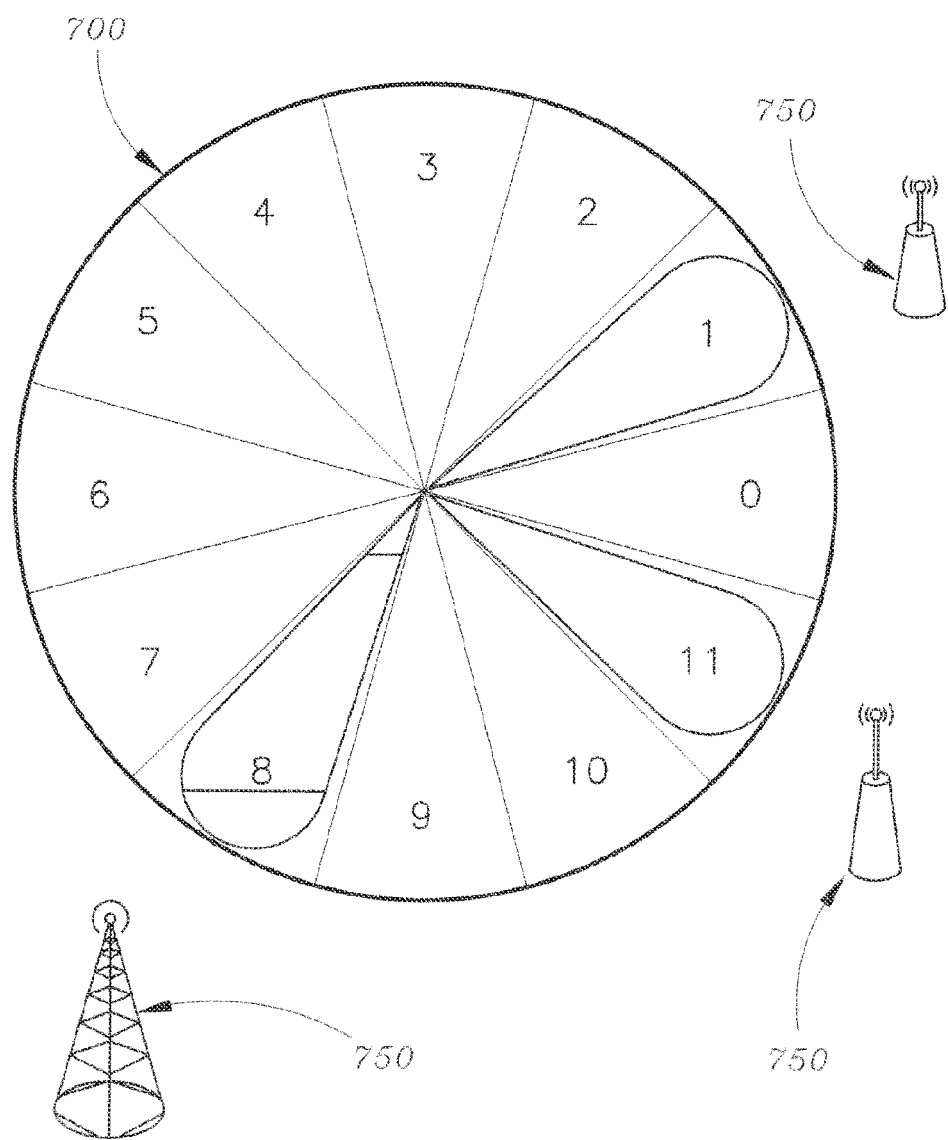
FIG. 8 is a schematic diagram illustrating an antenna system, which is shown identifying sectors of interest from among the plurality of sectors of its monitored RF environment, said sectors of interest having transmitters located within them in accordance with an exemplary embodiment of the present disclosure.

As the sectors are being cycled through by the antenna system 700, the one or more measurements for a given sector are obtained (ex.—determined) during a dwell (ex.—dwell time) for that sector (ex.—an amount of time spent monitoring that sector). Dwell time may be dependent upon a bandwidth of a signal(s) being received. Once the dwell time for that sector has expired, the antenna system 700 will switch or cycle to a next sector of the omni-pattern to be examined. In exemplary embodiments, the time taken for this switching to occur (ex.—switching time) may be less than 1 microsecond. This fast switching capability of the multi-ring parasitic antenna 400 of the present invention allows for reduced time wasted between dwells and promotes efficiency over currently available solutions for monitoring an RF environment. For example, currently available solutions, such as a gimbaled antenna may have a switching time which may take longer than 0.1 seconds. In further embodiments, the antenna system 700 may be configured for monitoring sectors (ex.—directions) of interest. For instance, rather than assigning equal dwell times for each sector, the antenna system 700 may be configured for returning more often and/or for assigning longer dwell times to sectors of interest. For example, as shown in FIG. 8, in embodiments in which average power per sector is measured, in subsequent sweeps or cycles of the antenna system 700, dwell times may be restricted to sectors which were determined by the antenna system 700 as having higher average measured power (such as sectors 1, 8 and 11 in FIGS. 7 and 8).

As mentioned above, based upon the measured average power (ex.—of the signals received from the transmitters 750 by the antenna 400) per sector, the antenna system 700 may determine which sector(s) the transmitter(s) 750 of said signals may be located in. For instance, as shown in FIGS. 7 and 8, the antenna system 700 may make a determination that the transmitters 750 are located in sectors 1, 8 and 11. In exemplary embodiments, the antenna system 700 and/or antenna 400 may be configured with a number of sets of diode settings corresponding to the number of sectors. For instance, the antenna 400 may have twelve sets of diode settings, each with a thirty degree beamwidth, corresponding to the twelve sectors.

Figure 9:
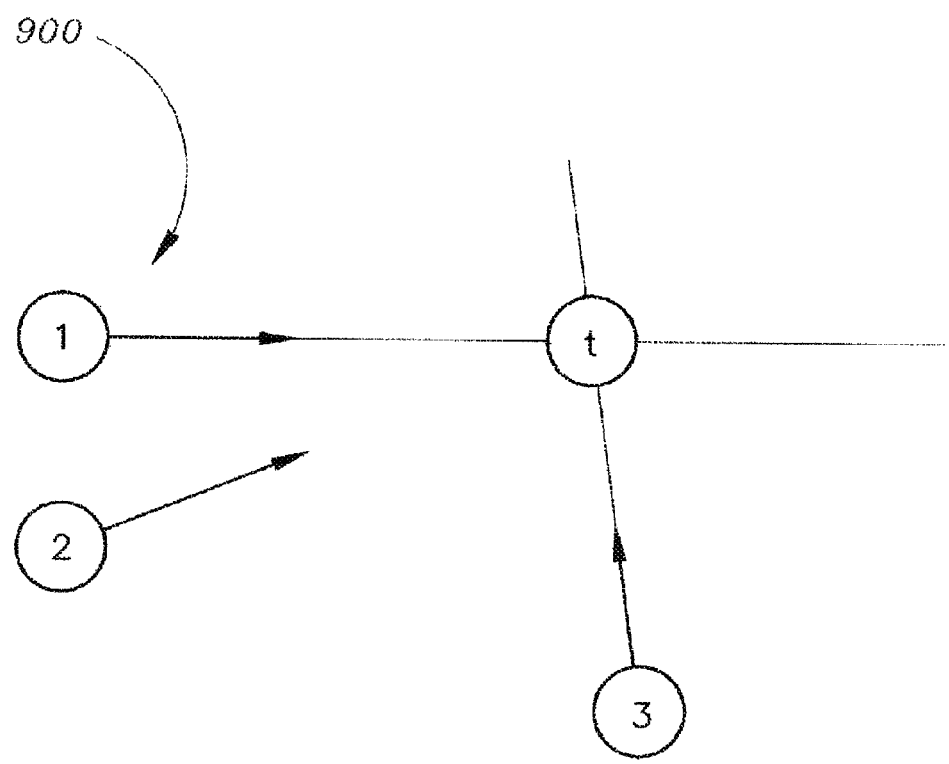
FIG. 9 is a schematic diagram of a network of nodes, one or more nodes of the network implementing the antenna system of FIG. 7, said network of nodes being implemented for geolocation of a transmitter node in accordance with an exemplary embodiment of the present disclosure.

In exemplary embodiments, the antenna 400 and/or antenna system 700 may be and/or may be implemented as part of a communications (ex.—sensing) node, such as a cognitive radio. Further, the antenna 400 may be utilized by the node for communicating with other nodes, and/or monitoring RF spectral and spatial use. As mentioned above, the antenna 400 may be configured for transmitting and/or receiving signals, and may be operated in an omni-directional mode. In further embodiments, the antenna 400 and/or antenna system 700 may be one node included in a plurality of nodes, said plurality of nodes (labeled "1", "2", "3" in FIG. 9) forming a network 900, as shown in FIG. 9.

In current exemplary embodiments of the present disclosure, the network 900 may be involved in requesting sectors to measure and/or monitor. For instance, if attempting to estimate a source position (ex.—of a jammer) using time difference of arrival (TDOA), nodes with favorable positions may be used for data collection, to improve locating accuracy and/or to conserve bandwidth of the network 900. Further, it may be possible to use position and sector information from the nodes in order to decide which node would provide more favorable estimates, thereby minimizing network bandwidth required to support geo-location. FIG. 9 shows three nodes (ex.—receiving nodes, labeled "1", "2" and "3") with arrows showing the sector pointing at a fourth node (ex.—transmitting node, labeled "t"). Based on node locations and pointing directions, the network 900 may decide that nodes "1" and "3" would be better for geolocation than node "2", due to the closer proximity of nodes "1" and "3" to the transmitter node ("t"), thereby causing just nodes "1" and "3" (and not node "2") to perform geolocation of the transmitter node ("t"). Thus, the network 900 may avoid unproductive and/or unnecessary measurements being performed by one or more of the network nodes, thereby promoting conservation of network bandwidth. In further embodiments, the nodes of the network 900 may utilize an inertial navigation system (INS) to correct for vehicle attitude and to provide absolute point directions.

In exemplary embodiments of the present disclosure, the antenna 400 and/or antenna system 700 may have a plurality of operating modes. A first operating mode may be continuous sweep mode for providing directional per sector measurements. For example, if receiving multiple RF channels, the antenna 400 and/or antenna system 700 may monitor which RF channels are in use and in which directions. A second operating mode may involve the antenna 400 and/or antenna system 700 receiving signals in an omni-directional mode, then, when a signal of interest is detected, quickly sweeping the antenna to find a direction of the signal of interest and to acquire samples for analysis. Further, the antenna 400 and/or antenna system 700 may have various beam patterns, such as omni, narrow sector, wide sector, and/or null in a given direction.

Using a parasitic antenna (ex.—multi-ring parasitic antenna) 400 and/or parasitic antenna system 700 as discussed above, it may be possible to quickly scan all sectors and/or monitor sectors of interest. The directionality of the parasitic antenna 400 may reduce interference and multipath, along with providing improved Signal-to-Noise Ratio (SNR) due to antenna gain. This would allow data collection on signals of interest in a more favorable environment, enabling analysis, such as: frequency and spatial use; signal detection; signal identification; and source geolocation, to succeed when it may have failed with an omni-antenna. Given the low SWAP-C for the parasitic antenna 400, it may be used by many/all nodes in a network. Further, as described above, analysis from multiple nodes of the network may be used cooperatively to gain network-wide awareness.

Figure 10:
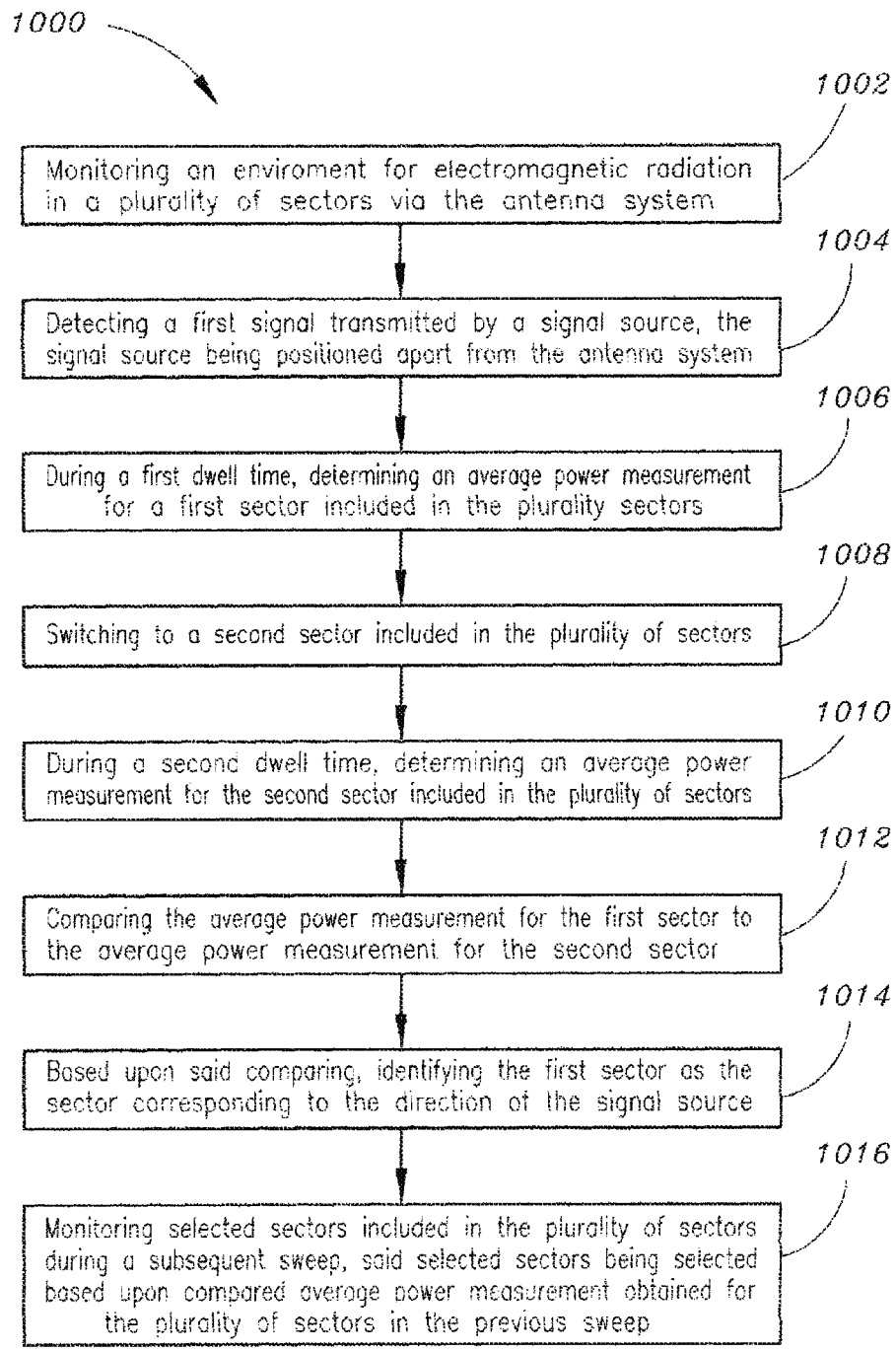
FIG. 10 depicts a flowchart illustrating a method for providing directional spectral awareness via an antenna system, in accordance with an exemplary embodiment of the present disclosure.

Referring generally to FIG. 10, a flowchart illustrating a method for providing directional spectral awareness via an antenna system in accordance with an exemplary embodiment of the present disclosure is shown. The method 1000 may include the step of monitoring an environment for electromagnetic radiation in a plurality of sectors via the antenna system 1002. The antenna system may have a first mode and a second mode, the antenna system being configured for omni-directional signal reception from the plurality of sectors via the first mode, the antenna system being configured for transmission of electromagnetic radiation into and reception of electromagnetic radiation from at least one selected sector included in the plurality of sectors via the second mode. The method 1000 may further include the step of detecting a first signal transmitted by a signal source, the signal source being positioned apart from the antenna system 1004. The method 1000 may further include the step of sweeping through the plurality of sectors, including the steps of: during a first dwell time, determining a measurement (exs.—an average power measurement, a data rate measurement, etc.) for a first sector included in the plurality of sectors 1006; switching to a second sector included in the plurality of sectors 1008; and during a second dwell time, determining a measurement (ex.—an average power measurement, a data rate measurement, etc.) for the second sector included in the plurality of sectors 1010. The method 1000 may further include the step of, based upon said sweeping, identifying a sector corresponding to a direction of the signal source, including comparing the measurement for the first sector to the measurement for the second sector 1012. The method 1000 may further include the step of, based upon said comparing, identifying the first sector as the sector corresponding to the direction of the signal source 1014. The method 100 may further include the step of monitoring selected sectors included in the plurality of sectors during a subsequent sweep, said selected sectors being selected based upon compared measurements obtained for the plurality of sectors in the previous sweep 1016.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium/computer-readable storage medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present disclosure. The accompanying method claims present elements of the various steps in a sample order, and are not meant to be limited to the specific order or hierarchy presented.

It is believed that the present disclosure and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for providing directional spectral awareness via an antenna system, said method comprising:
    monitoring an environment for electromagnetic radiation in a plurality of sectors via the antenna system, the antenna system having a first mode and a second mode, the antenna system being configured for omni-directional signal reception from the plurality of sectors via the first mode, the antenna system being configured for transmission of electromagnetic radiation into and reception of electromagnetic radiation from at least one selected sector included in the plurality of sectors via the second mode;
    detecting a first signal transmitted by a signal source, the signal source being positioned apart from the antenna system;
    sweeping through the plurality of sectors, wherein sweeping through the plurality of sectors includes:
        during a first dwell time, determining a measurement for a first sector included in the plurality of sectors;
        switching to a second sector included in the plurality of sectors; and
        during a second dwell time, determining a measurement for the second sector included in the plurality of sectors; and
    based upon said sweeping, identifying a sector corresponding to a direction of the signal source, wherein identifying the sector corresponding to the direction of the signal source includes comparing the measurement for the first sector to the measurement for the second sector, wherein the antenna system includes a parasitic antenna and processor, said processor being communicatively coupled with the parasitic antenna.

2. A method as claimed in claim 1, further comprising:
based upon said comparing, identifying the first sector as the sector corresponding to the direction of the signal source.

3. A method as claimed in claim 2, further comprising:
monitoring selected sectors included in the plurality of sectors during a subsequent sweep, said selected sectors being selected based upon compared measurements obtained for the plurality of sectors in the previous sweep.

4. A method as claimed in claim 1, wherein the measurement for the first sector is an average power measurement for the first sector and the measurement for the second sector is an average power measurement for the second sector.

5. A method as claimed in claim 3, wherein the compared measurements obtained for the plurality of sectors include at least one of: average power, modulation type, data rate, bandwidth, center frequency, and spectral shape.

6. A computer program product, comprising:
a non-transitory computer-readable storage medium including computer-usable program code for performing a method for providing directional spectral awareness via an antenna system, the computer program product including:
computer-usable program code for monitoring an environment for electromagnetic radiation in a plurality of sectors via the antenna system, the antenna system having a first mode and a second mode, the antenna system being configured for omni-directional signal reception from the plurality of sectors via the first mode, the antenna system being configured for transmission of electromagnetic radiation into and reception of electromagnetic radiation from at least one selected sector included in the plurality of sectors via the second mode;
computer-usable program code for detecting a first signal transmitted by a signal source, the signal source being positioned apart from the antenna system; computer-usable program code for sweeping through the plurality of sectors, wherein sweeping through the plurality of sectors includes:
during a first dwell time, determining a measurement for a first sector included in the plurality of sectors;
switching to a second sector included in the plurality of sectors; and
during a second dwell time, determining a measurement for the second sector included in the plurality of sectors; and
computer-usable program code for, based upon said sweeping, identifying a sector corresponding to a direction of the signal source,
wherein the antenna system includes a parasitic antenna and a processor, said processor being communicatively coupled with the parasitic antenna.

7. A computer program product as claimed in claim 6, further comprising:
computer-usable program code for, based upon said comparing, identifying the first sector as the sector corresponding to the direction of the signal source.

8. A computer program product as claimed in claim 7, further comprising:
computer-usable program code for monitoring selected sectors included in the plurality of sectors during a subsequent sweep, said selected sectors being selected based upon compared measurements obtained for the plurality of sectors in the previous sweep.

9. A computer program product as claimed in claim 6, wherein the measurement for the first sector is an average power measurement for the first sector and the measurement for the second sector is an average power measurement for the second sector.

10. A computer program product as claimed in claim 8, wherein the compared measurements obtained for the plurality of sectors include at least one of: average power, modulation type, data rate, bandwidth, center frequency, and spectral shape.

11. An antenna system, comprising:
a parasitic antenna, the parasitic antenna being configured for receiving a signal from a signal source, the signal source being positioned apart from the parasitic antenna in a first directional orientation relative to the parasitic antenna, the parasitic antenna being configurable for transmitting and receiving electromagnetic radiation in a selectable direction; and
a processor, the processor being communicatively coupled to the parasitic antenna, the processor being configured for directing the parasitic antenna to sweep through a plurality of directions for identifying a first direction corresponding to the first directional orientation of the first signal source,
wherein the first direction corresponding to the first directional orientation of the first signal source is identified based upon comparison of measurements for sectors of a Radio Frequency (RF) environment being monitored by the antenna system, wherein the antenna system is configured for being implemented in a cognitive radio.

12. An antenna system as claimed in claim 11, wherein the compared measurements obtained for the plurality of sectors include at least one of: average power, modulation type, data rate, bandwidth, center frequency, and spectral shape.

* * * * *